K. KUCHARSKI.
MOTOR PLOW.
APPLICATION FILED JUNE 6, 1916.
1,270,627.
Patented June 25, 1918.
3 SHEETS—SHEET 3.
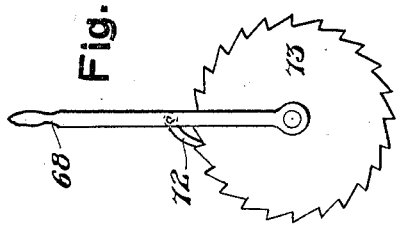
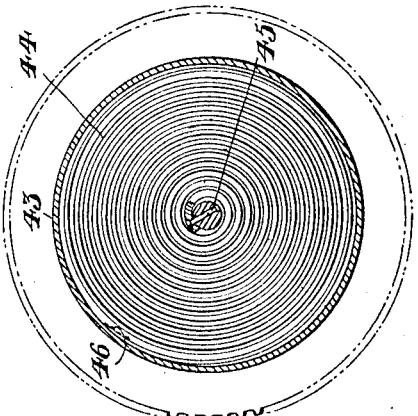
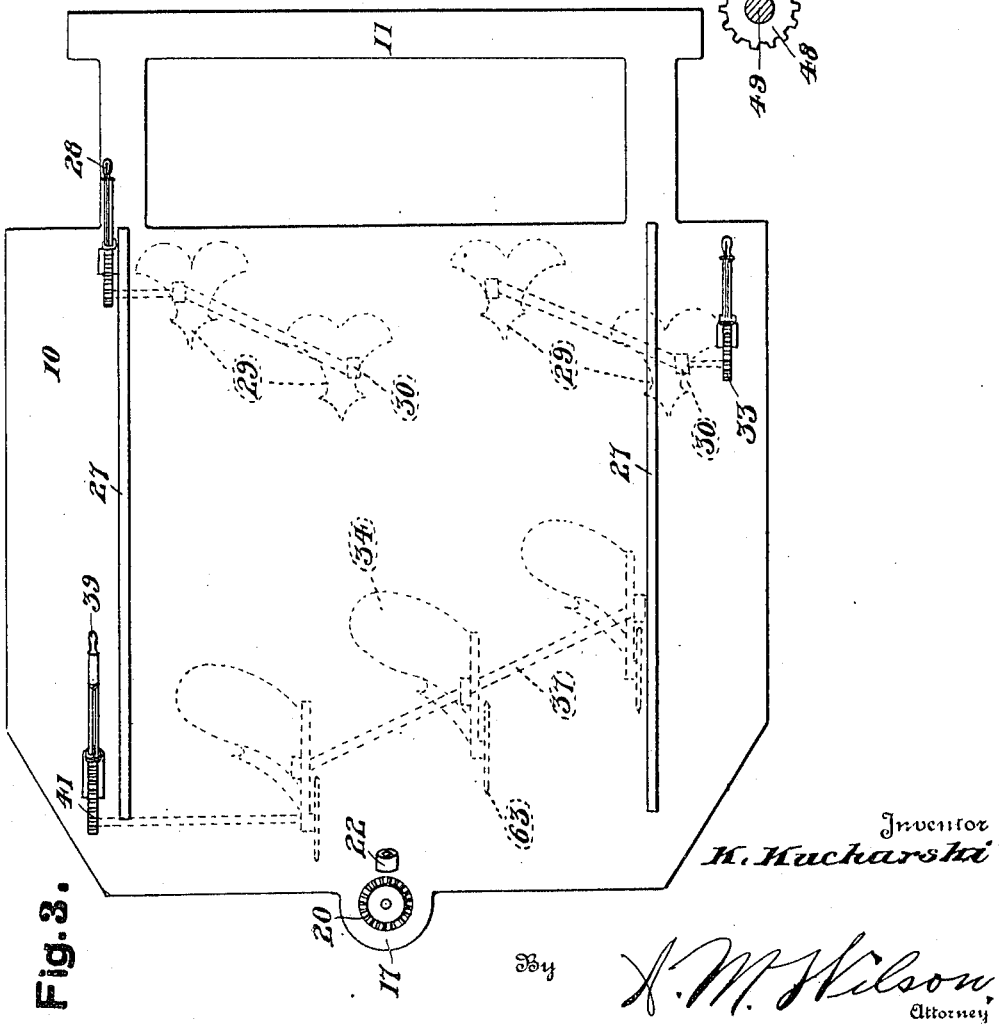
Inventor
K. Kucharski
By
H. M. Wilson
Attorney

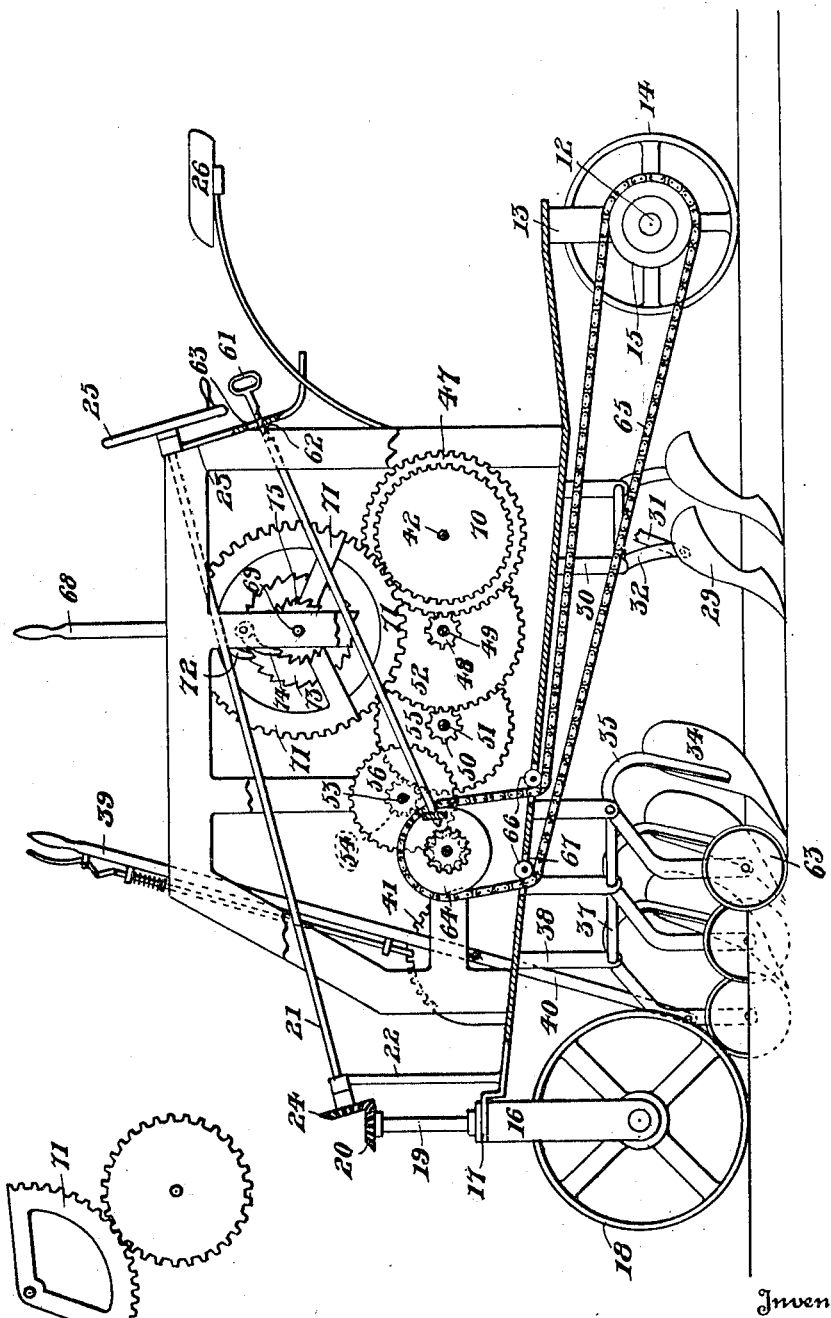

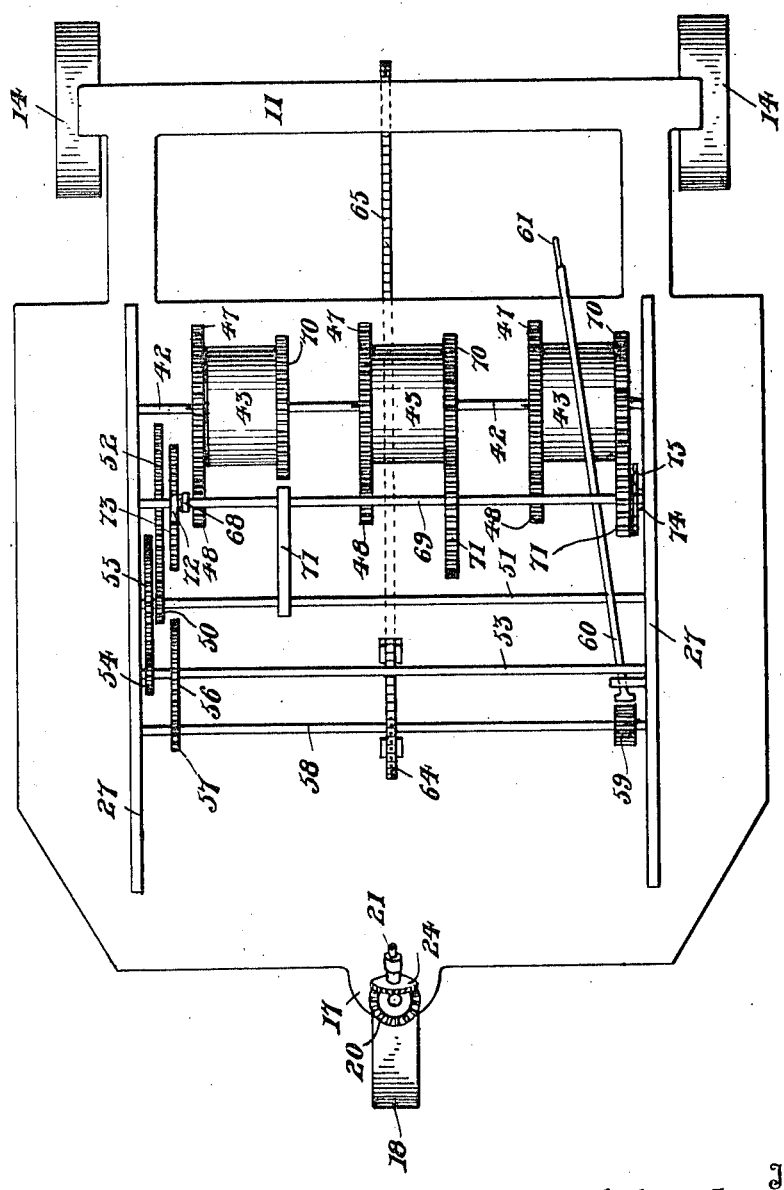

UNITED STATES PATENT OFFICE.

KONSTANTY KUCHARSKI, OF THURBER, TEXAS.

MOTOR-PLOW.

1,270,627.                    Specification of Letters Patent.        Patented June 25, 1918.

Application filed June 6, 1916. Serial No. 101,976.

*To all whom it may concern:*

Be it known that I, KONSTANTY KUCH-ARSKI, a subject of the Czar of Russia, residing at Thurber, in the county of Erath and State of Texas, have invented certain new and useful Improvements in Motor-Plows, of which the following is a specification.

This invention relates to new and useful improvements in motor plows.

The primary object of the invention is the provision of a plow provided with a spring actuated motor driving device, the latter being rewound for use by the hand of the operator without leaving the driver's seat.

A further object of this device is to provide a plow having a plurality of mold-boards and provided with an inexpensive motor means eliminating the use of draft-animals whereby the motive power will be without cost while a single operator may completely manipulate the device.

A still further object is to provide an agricultural implement arranged with a spring motor whereby the same may be propelled over the field, and when the motor has become run down, the same is readily rewound by the operator who has full control of the same as well as of the plows and the steering device for the implement.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Figure 1 is a side elevation of the device partially broken away.

Fig. 2 is a top plan view thereof with parts removed.

Fig. 3 is a view similar to Fig. 2 with the plow members operatively arranged, portions thereof being illustrated in dotted lines.

Fig. 4 is a radial sectional view through one of the motor drums.

Fig. 5 is a side elevation of the winding lever means, and

Fig. 6 is a side elevation of one of the winding segments meshing with a drum gear.

Referring to the drawings, a platform 10 is provided having a rearwardly extending frame 11 to the rear end of which a driving axle 12 is journaled in depending brackets 13 while traction wheels 14 are secured to the opposite ends of the axle 12 while a driving pulley or sprocket wheel 15 is mounted substantially centrally upon the said axle.

A fork 16 is journaled in the forward reduced end 17 of the platform 10 having a ground engaging steering wheel 18 carried thereby, while a steering post 19 carried by the fork is arranged with a pinion 20 upon its free upper end. A steering shaft 21 is obliquely journaled in forward and rearward brackets 22 and 23 respectively having a beveled gear 24 at its forward end in constant mesh with the pinion 20 and with a steering wheel 25 at its rear end positioned adjacent the driver's seat 26.

Opposite upright skeleton frames 27 are mounted upon the platform 10 and oppositely arranged shifting levers 28 are carried outwardly of the said frames adjacent the rear of the said platform. Two sets of cultivator teeth or small plows 29 are suspended by means of arms 30 from the platform 10 adjacent the rear portion thereof and are controlled by means of levers 28 having their lower end extensions 31 secured to the hangers 32 of the teeth 29. Retaining racks 33 are provided for each of the levers 28 in the usual manner.

The main operating plows for the device consist of mold-boards 34 mounted upon yokes 35, each of the same having a small ground wheel 36 arranged forwardly of its respective mold-board, the said yokes being secured to a shaft 37 journaled in depending arms 38 carried by the platform 10. An operating hand lever 39 is provided for the plows 34 being pivoted adjacent one of the forward corners of the platform 10 and having its lower end extension 40 pivotally attached to the terminal one of said yokes 35, a retaining rack 41 being provided for the said lever 39.

The manner of steering the device by means of the hand wheel 25 and the ground wheel 18 will be fully understood as well as the way in which the plows 34 and teeth 29 are elevated and lowered by means of the levers 39 and 28 respectively.

A motor shaft 42 is journaled through the side frames 27 adjacent the rear ends thereof and is provided with a plurality of driving drums 43, here illustrated as three in number, each of which has a coil spring 44 arranged therein and secured at one end as at 45 to the shaft 42 and at the other end to the drum 43, as at 46.

A driving gear 47 is adjacent each of the drums 43 fixedly secured concentrically upon the shaft 42 while a relatively smaller pinion 48 is provided in mesh with each of the gears 47, the said pinions 48 being mounted upon a transverse shaft 49 carried by the frames 27 forwardly of the shaft 42. A further pinion 50 is mounted upon a transverse shaft 51 while a gear 52 upon the shaft 49 is in constant mesh with the pinion 50.

In a similar manner, a transverse shaft 53 is provided with a pinion 54 in mesh with a gear 55 upon the shaft 51, while a gear 56 upon the shaft 53 is in constant mesh with a pinion 57 upon a transverse shaft 58 journaled in the frames 27 adjacent the forward end of the platform 10. A toothed stop wheel 59 is mounted upon the shaft 58 having a brake lever 60 adapted to engage the wheel 59 for preventing the turning of the shaft 58 as well as the driving shaft 42, the free end of the lever 60 having a hand loop 61 positioned adjacent the driver's seat 26 and further having teeth 62 engaging in a slot 63 of the bracket 23 for maintaining the lever 60 in its adjusted position.

A sprocket wheel 64 is carried substantially centrally upon the shaft 58 while a sprocket chain 65 extends over the sprocket wheel 64 and idlers 66 arranged in slots 67 of the platform 10 and thence passes over the sprocket 15 of the rear axle 12. It will thus be understood that when the drums have their springs 44 wound up under tension, a releasing of the stop wheel 59 by exerting a pull upon the lever 60 allows the springs 44 to unwind and through the agency of the train of gears and pinions hereinbefore described propels the traction wheels 14, thus causing the implement to move forwardly.

A winding device for the springs 44 is provided which is actuated by a lever 68 freely journaled upon a transverse shaft 69 forwardly of the steering wheel 25, the same being adapted for turning the shaft 42 in the proper direction for winding up the springs 44. A gear 70 is secured to each of the drums 43 being freely journaled concentrically upon the shaft 42 and adapted to be engaged successively by three similar segment gears 71 secured upon the shaft 69 at circumferentially arranged third parts of a circle. This arrangement of the segment gears 71 places one of the same at all times in operative mesh with one of the gears 70 so that during the revolution of the shaft 69 the shaft 42 will be continuously revolved by the said gears 71 acting one at a time so that each of the drums 43 through its gear 70 will take an equal portion of the winding strain, while no two drums will be under the strain for any considerable length of time.

The lever 68 being journaled upon the shaft 69 is provided with a pawl 72 adapted to engage the teeth of a wheel 73 mounted securely upon the shaft 69 and whereby a forward movement of the lever 68 will turn the wheel 73 and the shaft 69 in a direction to wind up the springs 44, a dog 74 being mounted upon one of the side frames 27 for engaging a toothed wheel 75 for retaining the shaft from reversing its movement.

The springs 44 being placed under tension by means of the lever 68 when the brake lever 60 is in engagement with the stop wheel 59, it is only necessary to release the stop lever 60 and allow the springs 44 to unwind when desired to forwardly propel the device, the force of the springs then being communicated with the axle 12 of the traction wheels 14 through the means heretofore fully described.

The present form of the invention is believed to be preferable, although minor changes may be made therein without departing from the spirit and scope of the invention as claimed.

What is claimed as new is:—

A device of the class described including a wheel-supported platform, a pair of spaced skeleton frames secured to and rising vertically from the opposite side of the platform, a motor shaft journaled in the said skeleton frames adjacent the rear ends thereof, a plurality of driving drums secured upon said shaft, a spring in each drum and each spring having one end secured to its respective drum and its other end to the shaft, a driving gear secured to each of the drums and the shaft, a second shaft journaled in said skeleton frames forward of the motor shaft, pinions secured to said second shaft and meshing with the drum gears, a third shaft journaled in said frame beyond said second shaft, a toothed stop wheel secured to said third shaft, a brake lever slidably supported by one of the skeleton frames and having one end normally engaging the tooth stop wheel, means for connecting the third shaft in operative relation with the driving shaft, means for connecting the wheels of the platform in operative relation to the third shaft whereupon rearward sliding movement of the brake lever will cause the motor shaft to rotate the gears and shafts and propel the wheel platform, and a winding mechanism for said springs of the drum.

In testimony whereof I affix my signature.

KONSTANTY KUCHARSKI.

Copies of this patent may be obtained for five cents each, by addressing the "Commissioner of Patents, Washington, D. C."